(12) United States Patent
Ikeda

(10) Patent No.: US 9,032,481 B2
(45) Date of Patent: May 12, 2015

(54) INFORMATION PROCESSING APPARATUS AND CONTROL METHOD THEREOF

(71) Applicant: Canon Kabushiki Kaisha, Tokyo (JP)

(72) Inventor: Atsushi Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 13/834,570

(22) Filed: Mar. 15, 2013

(65) Prior Publication Data

US 2013/0291061 A1   Oct. 31, 2013

(30) Foreign Application Priority Data

Apr. 26, 2012 (JP) ................ 2012-101676
Mar. 14, 2013 (JP) ................ 2013-051134

(51) Int. Cl.
*G06F 21/00* (2013.01)
*H04L 29/06* (2006.01)
*H04W 12/08* (2009.01)
*H04W 4/02* (2009.01)

(52) U.S. Cl.
CPC ............ *H04L 63/107* (2013.01); *H04W 12/08* (2013.01); *H04W 4/021* (2013.01)

(58) Field of Classification Search
USPC ....................................... 726/3–10
See application file for complete search history.

(56) References Cited

U.S. PATENT DOCUMENTS

| 2006/0253453 | A1 | 11/2006 | Chmaytelli et al. ............ 707/10 |
| 2010/0077445 | A1 | 3/2010 | Schneider et al. ............ 726/1 |
| 2012/0036245 | A1* | 2/2012 | Dare et al. .................... 709/223 |
| 2012/0233695 | A1* | 9/2012 | Mahaffey et al. .............. 726/23 |

FOREIGN PATENT DOCUMENTS

| JP | 2010-079901 A | 4/2010 |
| JP | 2011-170864 A | 1/2011 |

* cited by examiner

*Primary Examiner* — Ghazal Shehni
(74) *Attorney, Agent, or Firm* — Fitzpatrick, Cella, Harper & Scinto

(57) ABSTRACT

An application to be installed is acquired. Security policy geographic information, which is geographic information of an application's target distribution area where a user permits installation, is acquired from security policy that defines processing regarding the application. Application geographic information, which is geographic information of an application's target distribution area, is acquired from the acquired application. Based on a comparison result of comparing the security policy geographic information with the application geographic information, whether or not to permit installation of the acquired application is determined.

12 Claims, 16 Drawing Sheets

F I G. 1
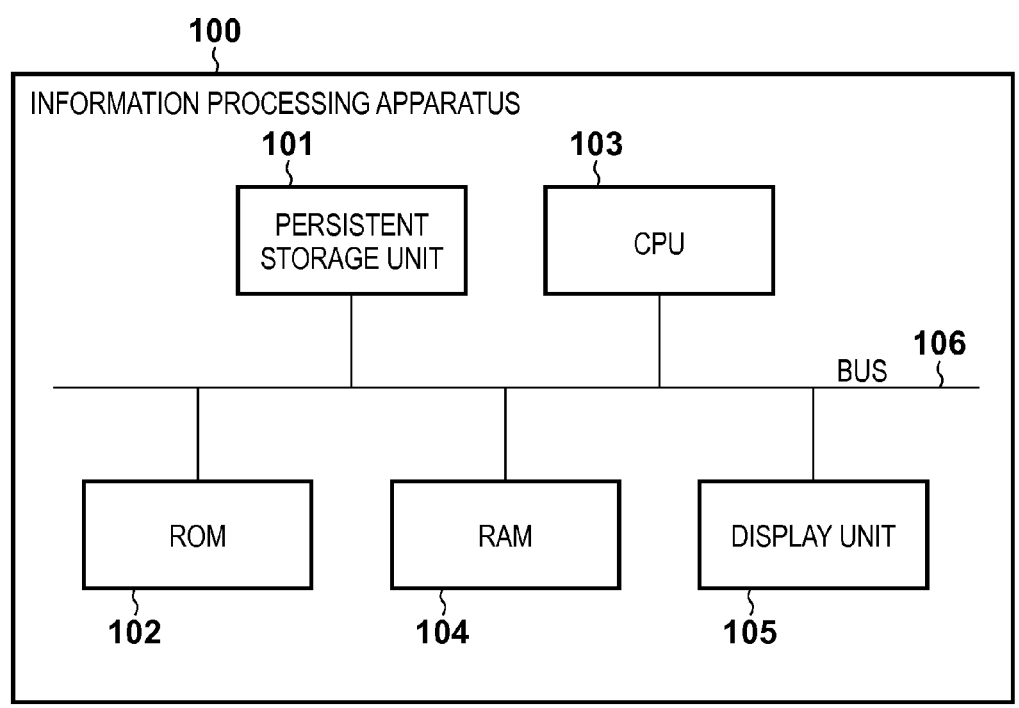

FIG. 4A

```
<rule install="permit">
   <country value="Japan">
      <prefecture value="Tokyo">
         <district value="Ota"></district>
      </prefecture>
   </country>
</rule>
```

FIG. 4B

```
<region>
   <country value="Japan">
      <prefecture value="Tokyo">
         <district value="Minato"></district>
         <district value="Shinagawa"></district>
         <district value="Ota"></district>
      </prefecture>
   </country>
</region>
```

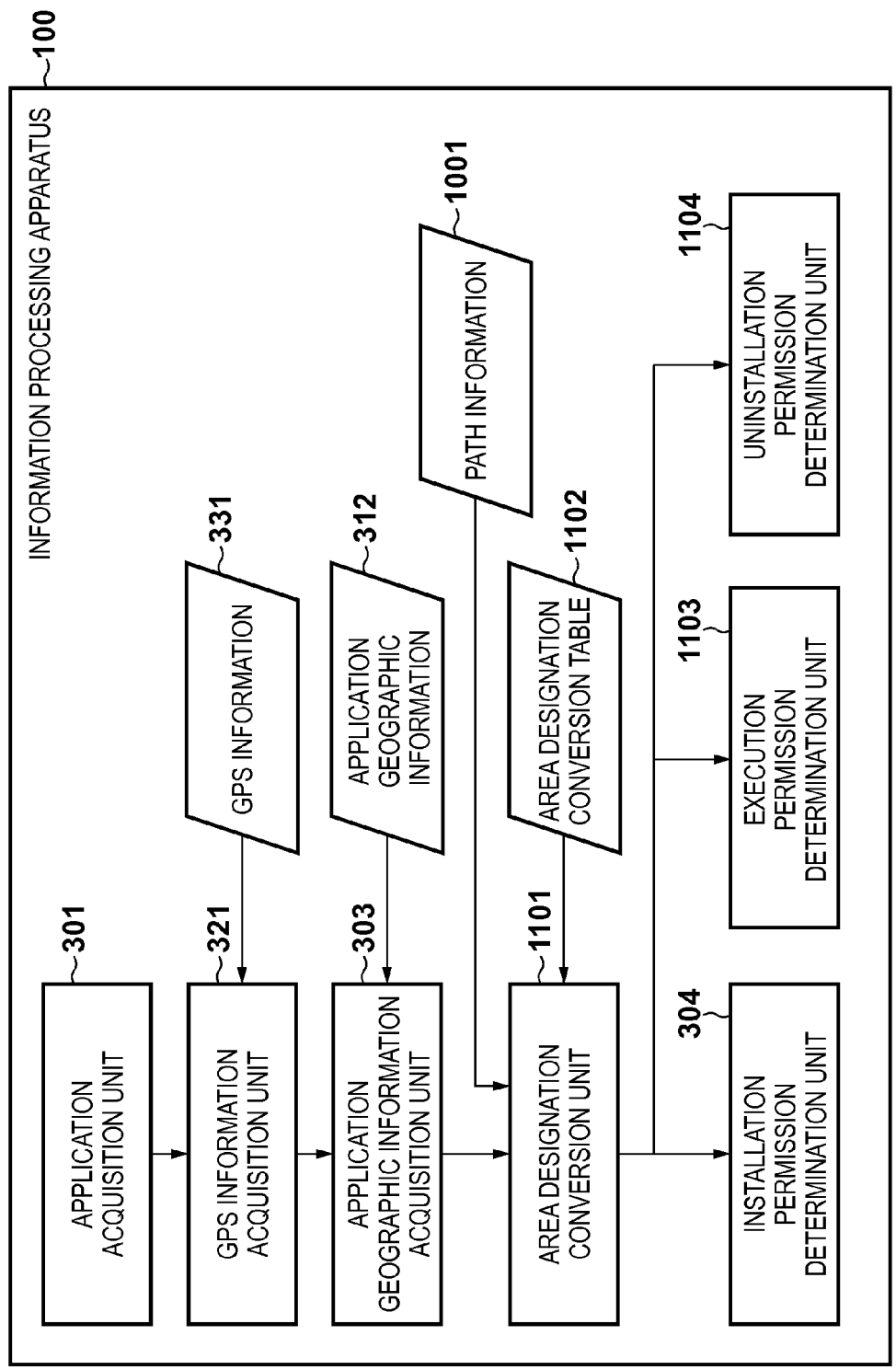

FIG. 9A
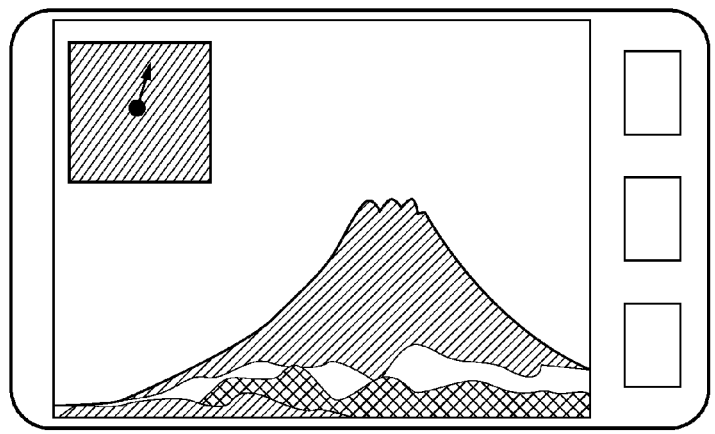
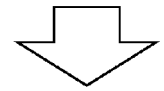
FIG. 9B
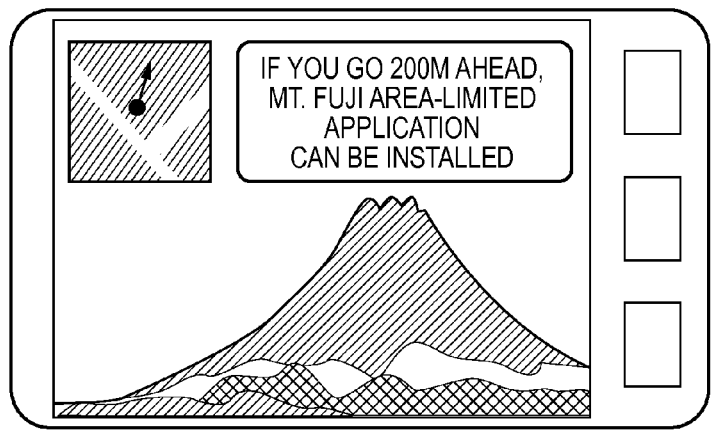
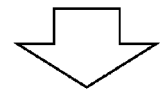
FIG. 9C
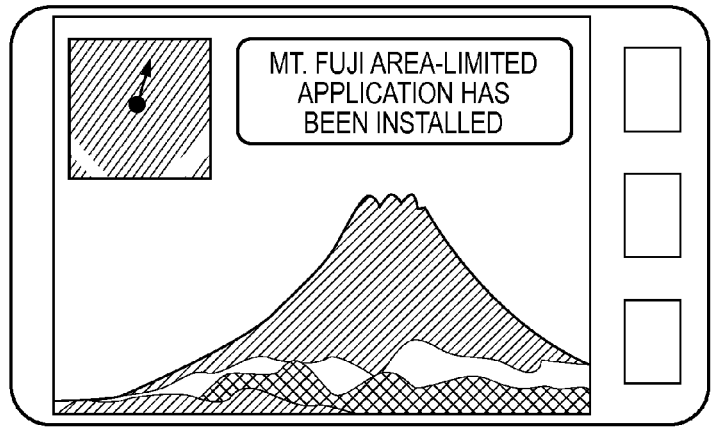

FIG. 10

| AREA DESIGNATION | CONVERSION RESULT (PATH INFORMATION) |
|---|---|
| JAPAN, TOKYO, OTA-DISTRICT, YANONLAND | M(35.635613, 139.877939), L(35.633503, 139.876898), L(35.630957, 139.877113), L(35.629404, 139.880074), L(35.62957, 139.882327), L(35.63087, 139.885717), L(35.632038, 139.887069), L(35.634907, 139.883582), L(35.636555, 139.88134), L(35.636075, 139.878636), Z |
| JAPAN, TOKYO, OTA-DISTRICT, YANONLAND ENTRANCE | M(35.634785, 139.877865), L(35.635526, 139.878271), L(35.63591, 139.879291), L(35.635709, 139.880117), L(35.635203, 139.879977), L(35.634689, 139.87808), Z |
| JAPAN, TOKYO, OTA-DISTRICT, YANONLAND CENTRAL AREA | M(35.633529, 139.879505), L(35.632631, 139.879376), L(35.632055, 139.980052), L(35.631855, 139.880986), L(35.633189, 139.881726), L(35.633965, 139.881254), L(35.633834, 139.879913), Z |
| ... | ... |
| JAPAN, TOKYO, OTA-DISTRICT, YANONLAND AREA E | M(35.633363, 139.87957), L(35.634331, 139.878411), L(35.633773, 139.877484), L(35.632801, 139.877232), L(35.631877, 139.877532), L(35.632683, 139.879313), Z |

F I G. 13A 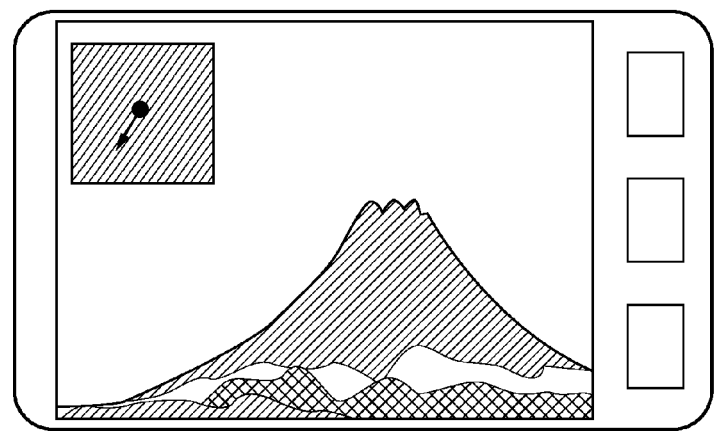
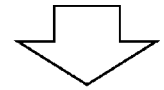
F I G. 13B 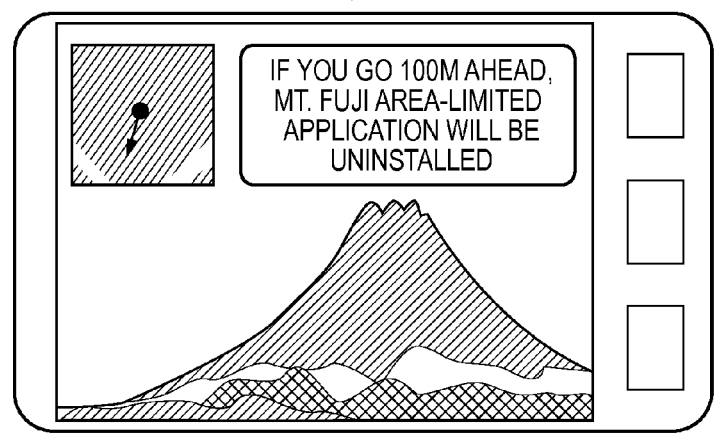
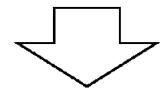
F I G. 13C 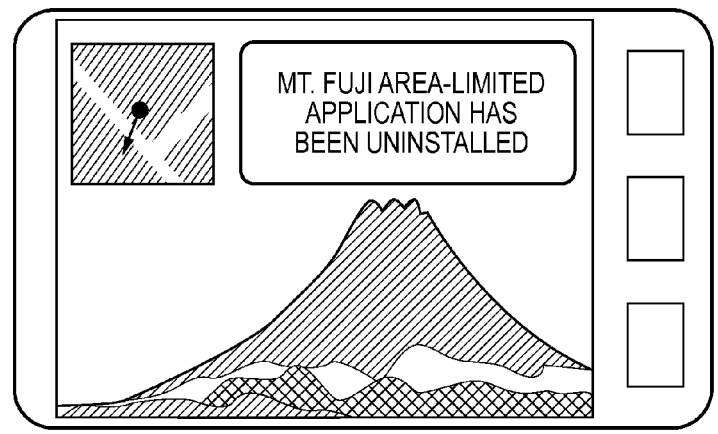

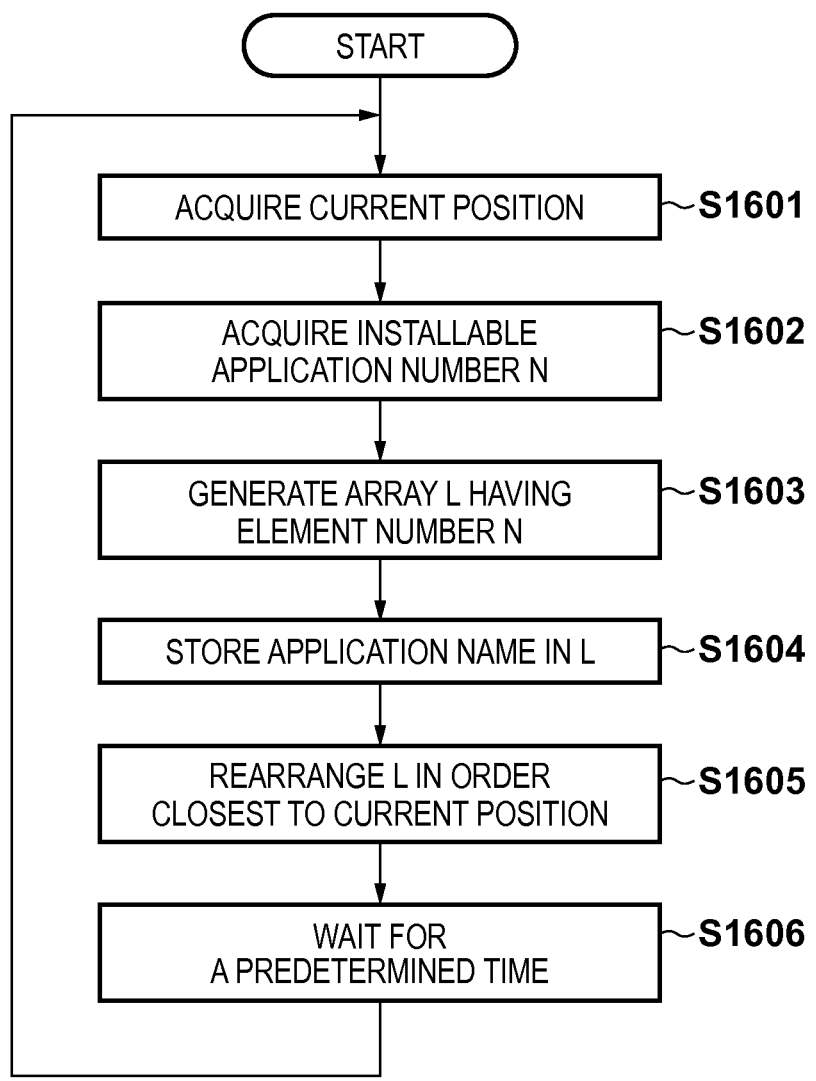
F I G. 14

INFORMATION PROCESSING APPARATUS AND CONTROL METHOD THEREOF

BACKGROUND OF THE INVENTION

1. Field of the Invention

The present invention relates to processing for limiting installation and execution of an application on a device.

2. Description of the Related Art

For applications operating particularly on a Web browser of a PC (Personal Computer), there are applications comprising HTML (HyperText Markup Language) files and JavaScript (registered trademark) files. These applications are sometimes called Widgets or Web applications. Such applications may include CSS (Cascading Style Sheets) files, image files, XML files, or the like.

Nowadays, these applications configured with HTML files and JavaScript files are used not only by PCs, but also by various devices. The WAC (Wholesale Applications Community) is developing, as a standard specification, a framework for distributing applications to devices through an application store on a network.

The WAC has a system called security policy for limiting the processing, such as installation or execution of applications on a device. For instance, in a case where an application uses a device-unique function, a declaration to use the function is embedded in the application. Whether the target function is available is described in the security policy of the device. When the application is started, the device refers to the security policy, and only when the security policy conforms to the declaration of use in the application, the device executes the application. For an application management method using security policy, there is a conventional technique utilizing a dedicated application and a dedicated server (Japanese Patent Laid-Open No. 2010-79901).

Meanwhile, efforts to utilize user's position information in an application that is operating on a device are advancing. For instance, there is an approach to switch applications provided to a user in accordance with user's position information. A method has been proposed (Japanese Patent Laid-Open. No. 2011-170864) for dynamically switching the contents provided to a user in accordance with device's geographic information.

In the conventional technique disclosed in Japanese Patent Laid-Open No. 2011-170864, geographic information is embedded in advertisement distributed by a server, and only the advertisement that conforms to the geographic information of the client apparatus is displayed on the apparatus.

According to Japanese Patent Laid-Open No. 2011-170864, because advertisement is automatically switched in accordance with geographic information of the client apparatus, if the technique is applied to application control in the form that complies with the WAC specification, user's intention cannot be reflected. For instance, assume a case where a user in Japan wants to execute an application that is distributed overseas. In this case, because the client apparatus exists in Japan, the user cannot execute the application distributed overseas. Also, it is impossible to limit installation or execution of the application in accordance with movement of the user.

The present invention provides an information processing technique that reflects user's preference or user's movement, when the information processing apparatus limits installation or execution of an application based on geographic information.

SUMMARY OF THE INVENTION

According to the aspect of the present invention, an information processing apparatus according to the present invention has the following configuration. More specifically, an information processing apparatus for controlling installation of an application, comprising: an acquisition unit configured to acquire an application to be installed; a security policy geographic information acquisition unit configured to acquire security policy geographic information, which is geographic information of a target distribution area of the application where a user permits installation, from security policy that defines processing regarding the application; an application geographic information acquisition unit configured to acquire application geographic information, which is geographic information of a target distribution area of the application, from the application acquired by the acquisition unit; and a determination unit configured to compare the security policy geographic information with the application geographic information, and determine whether or not to permit installation of the application acquired by the acquisition unit based on the comparison result.

According to the present invention, it is possible to reflect user's preference or user's movement when an information processing apparatus limits installation or execution of an application based on geographic information.

Further features of the present invention will become apparent from the following description of exemplary embodiments with reference to the attached drawings.

BRIEF DESCRIPTION OF THE DRAWINGS

FIG. 1 is a block diagram showing a hardware configuration of an information processing apparatus;

FIG. 4A is an exemplified description of security policy geographic information according to the first embodiment;

FIG. 4B is an exemplified description of application geographic information according to the first embodiment;

FIG. 7 is a block diagram showing a functional configuration according to the second and third embodiments;

FIGS. 9A to 9C are exemplified illustrations for notifying a way that enables application installation according to the second embodiment;

FIG. 10 is an exemplified view of a GPS information conversion table according to the second embodiment;

FIGS. 13A to 13C are exemplified illustrations for notifying that an application is uninstalled according to the third embodiment; and FIG. 14 is a flowchart describing processing according to the fourth embodiment.

DESCRIPTION OF THE EMBODIMENTS

Figure 2:
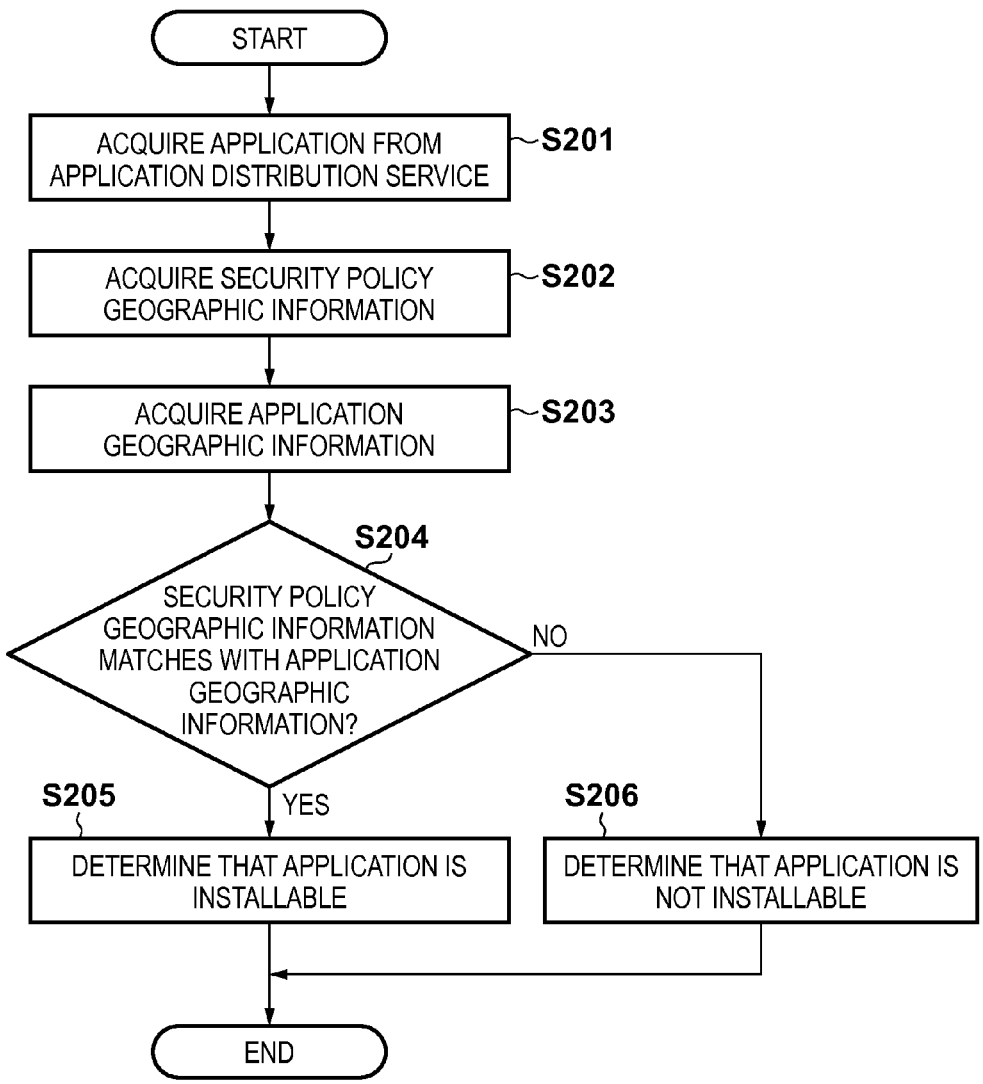
FIG. 2 is a flowchart describing processing according to the first embodiment.

Embodiments of the present invention will be described hereinafter in detail, with reference to the accompanying drawings. It is to be understood that the following embodiments are not intended to limit the claims of the present invention, and that not all of the combinations of the aspects that are described in the following embodiments are necessarily required with respect to the means to solve the problems according to the present invention. With respect to components having the same configuration, the same numerals are assigned in the description.

The present invention proposes a technique that can reflect user's preference when installation or execution of an application is limited based on geographic information. In addition, for an application developer, the present invention provides the function for describing, in an application setting file, geographic information regarding an application's distribution target area. Furthermore, for a user, the present invention provides the function for recording geographic information regarding a target area of a desired application in a security policy stored in an information processing apparatus, serving as a client apparatus.

First, geographic information is acquired from the application setting file. Next, geographic information described in the user's security policy (information that defines processing related to the application) is acquired. When the two pieces of information are congruent, the control that is associated with the geographic information acquired from the setting file is permitted.

Assume that the geographic information includes at least one of the following: latitude information, longitude information, country, prefecture, city, and path information. The path information is a set of order information and control point information used in a description language as exemplified by SVG (Scalable Vector Graphics).

First Embodiment

The first embodiment describes a case in which a user installs a Widget application on an information processing apparatus.

Widget is an application format defined by the WAC. A Widget comes in a package, and includes setting files described in XML and HTML files. It may also include JavaScript files, CSS files, image files, and the like. According to the WAC, a setting file described in XML is called config.xml.

Furthermore, the first embodiment describes a case in which, for instance, a user wants to permit installation of only the applications that are distributed to the area of Ota district in Tokyo. The geographic information handled in the first embodiment is a text string including at least one of the names of country, prefecture, and city.

A configuration of a computer apparatus that constitutes an information processing apparatus according to the first embodiment is described with reference to the block diagram in FIG. 1.

In FIG. 1, numeral 101 denotes a persistent storage unit for storing arbitrary data. Numeral 103 denotes a Central Processing Unit (CPU) for controlling the overall information processing apparatus 100. Numeral 102 denotes Read Only Memory (ROM) for storing parameters and programs that do not require changes. Numeral 104 denotes Random Access Memory (RAM) for temporarily storing data and programs supplied from an external apparatus or the like. Numeral 105 denotes a display unit serving as an interface for displaying stored data or supplied data. Numeral 106 denotes a system bus that communicably connects the units 101 to 105.

The information processing apparatus 100 can further comprise an interface for a pointing device such as a mouse, and an input device such as a keyboard for inputting data based on user's operation. The information processing apparatus 100 can also comprise a hard disk fixed to the information processing apparatus 100, and an external storage apparatus such as a memory card. Alternatively, the information processing apparatus 100 can comprise an external storage apparatus, including an optical disk such as an attachable/detachable flexible disk (FD), Compact Disk (CD) or the like, a magnetic or optical card, an IC card, a memory card, or the like. Furthermore, the information processing apparatus 100 can comprise a network interface or the like for connection to a network line, such as the Internet.

Figure 3:
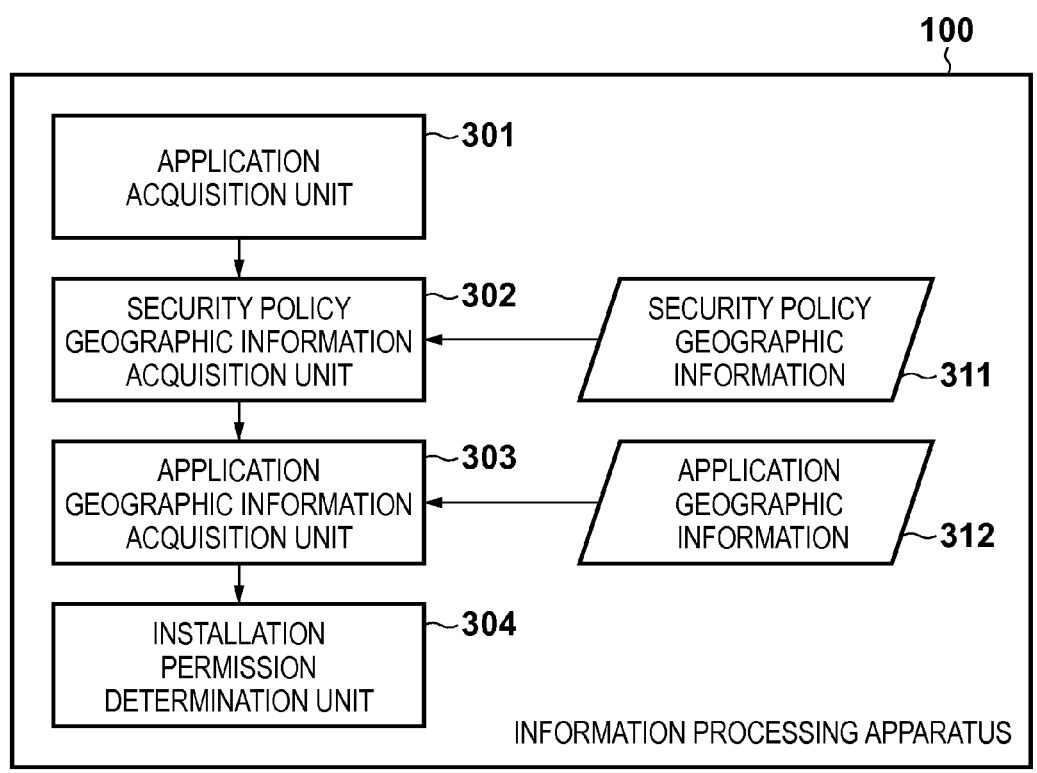
FIG. 3 is a block diagram showing a functional configuration according to the first embodiment.

FIG. 2 is a flowchart describing processing according to the first embodiment. This processing may be realized as a program controlled by the CPU 102 of the information processing apparatus 100, or may be realized by dedicated hardware. FIG. 3 is a block diagram showing a functional configuration according to the first embodiment. FIG. 2 shows part of the processing when a Widget is installed in a Widget execution environment. FIG. 3 shows part of the functional configuration of a Widget execution environment.

In FIG. 2, an application acquisition unit 301 acquires a application to be installed from an arbitrary application distribution service, which is provided by an external apparatus, such as a server on a network (step S201). Instead of the application distribution service, it is possible to acquire a application to be installed from applications that have been stored in the aforementioned external storage apparatus.

Next, a security policy geographic information acquisition unit 302 acquires, from a user's security policy, geographic information of a target distribution area, where a user permits installation of an application (step S202).

An exemplified description of the security policy geographic information is shown in FIG. 4A. The security policy in FIG. 4A indicates that it permits installation of an application which is distributed to the area of Ota-district, Tokyo, Japan, but it does not permit installation of other applications. In FIGS. 4A and 4B, the part enclosed within parentheses "<" and ">" will be referred to as an element. The description immediately after the parenthesis "<" will be referred to as an element name. In the description of the element, the left side of "=" will be referred to as an attribute or attribute name, and the right side of "=" will be referred to as a value of the attribute.

In FIG. 4A, the designation of country, prefecture, and city is described in the VALUE attribute of the <country>, <prefecture>, and <district> elements. Enclosing them within the <region> element indicates that it denotes geographic information. Furthermore, the <region> element is enclosed within the <rule> element. By the value of the install attribute or execute attribute of the <rule> element, whether to permit or forbid installation of an application with respect to the designated distribution target area is determined. In FIG. 4A, the value of the install attribute and execute attribute is "permit". Therefore, installation of an application distributed to the area of Ota-district ("ota"), Tokyo ("Tokyo"), Japan ("Japan") is permitted.

Herein, the geographic information of the target distribution area where the user permits installation of an application is referred to as security policy geographic information 311.

Next, an application geographic information acquisition unit 303 acquires geographic information of a target distribution area of the application from the application (step S203).

FIG. 4B is an exemplified description of application geographic information that designates a target distribution area of an application. FIG. 4B indicates that the application is distributed to the area of Minato-district ("Minato"), Shinagawa-district ("Shinagawa"), and Ota-district ("Ota") in Tokyo. Herein, the geographic information of the target distribution area of the application is referred to as application geographic information 312.

The application geographic information includes at least one of the following: geographic information of an area where application installation is permitted, geographic information of an area where application installation is forbidden, geographic information of an area where application execution is permitted, and geographic information of an area where application execution is forbidden.

Next, an installation permission determination unit 304 determines whether the application geographic information 312 matches with the policy described in the security policy geographic information 311 (step S204).

Figure 5:
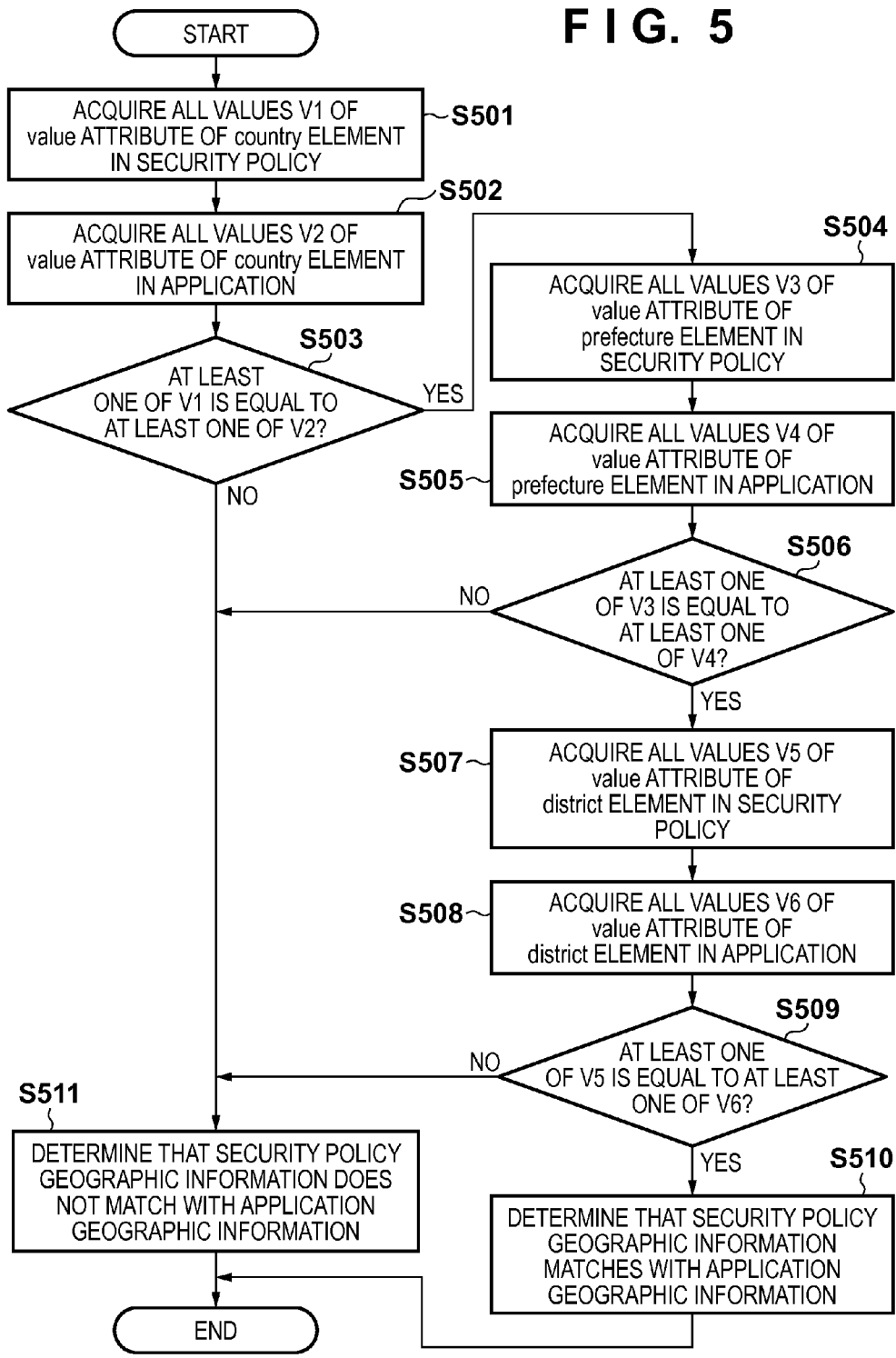
FIG. 5 is a flowchart describing detailed processing of installation permission determination according to the first embodiment.

Referring to FIG. 5, the determination method of the installation permission determination unit 304 in step S204 is described in detail. FIG. 5 is a flowchart describing detailed processing for determining whether the security policy geographic information 311 matches with the application geographic information 312.

In step S204, first, the installation permission determination unit 304 acquires all values V1 of the value attribute of the country element in the security policy (step S501). Next, the installation permission determination unit 304 acquires all values V2 of the value attribute of the country element in the application (step S502). In order to determine whether at least one of the values V1 acquired in step S501 matches with at least one of the values V2 acquired in step S502, the installation permission determination unit 304 compares the text string of each V1 to the text string of each V2 (step S503). When the results of the text string comparison match (YES in step S503), the processing goes to step S504. However, when the results of the text string comparison do not match (NO in step S503), the processing goes to step S511.

In step S504, the installation permission determination unit 304 acquires all values V3 of the value attribute of the prefecture element in the security policy. Thereafter, similar to steps S501 to S503, the installation permission determination unit 304 performs text string comparison with respect to the values of the value attribute of the prefecture element (steps S504 to S506). When the results of the text string comparison match (YES in step S506), the processing goes to step S507. However, when the results of the text string comparison do not match (NO in step S506), the processing goes to step S511. In the similar manner, the installation permission determination unit 304 performs text string comparison with respect to the district element (steps S507 to S509).

When equal values are detected in the security policy and the application with respect to all the country element, prefecture element, and district element (YES in step S509), the installation permission determination unit 304 determines that the security policy geographic information matches with the application geographic information (step S510). In other cases (NO in step S509), the installation permission determination unit 304 determines that the security policy geographic information does not match with the application geographic information (step S511).

By the aforementioned processing, when it is determined in step S204 that the application geographic information matches with the security policy geographic information (YES in step S204), the installation permission determination unit 304 determines that the application is installable (step S205). On the other hand, when it is determined that the application geographic information does not match with the security policy geographic information (NO in step S204), the installation permission determination unit 304 determines that the application is not installable (step S206).

As described above, according to the first embodiment, geographic information is acquired from the application's setting file. Next, geographic information described in the security policy of the user is acquired. When the two information are matched, the control that is associated with the geographic information acquired from the setting file is permitted. Accordingly, when installation or execution of an application is limited based on geographic information, user's preference can be reflected.

Second Embodiment

The second embodiment describes a configuration for determining whether or not installation or execution of an application is possible in accordance with user's movement, in a case where an installable area and an executable area are both described in application geographic information.

Figure 6A:
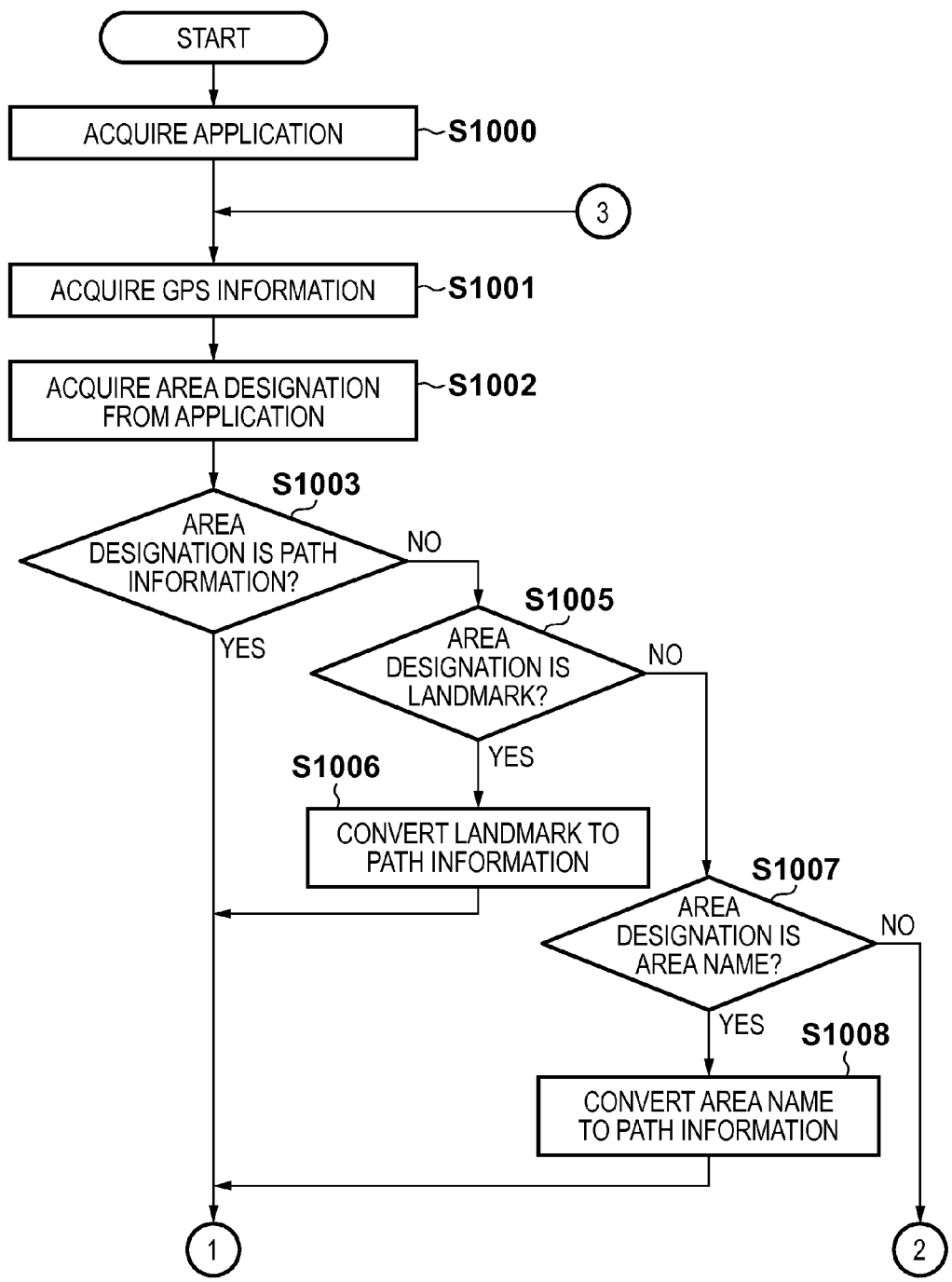
FIGS. 6A and 6B are a flowchart describing processing according to the second embodiment.
Figure 6B:
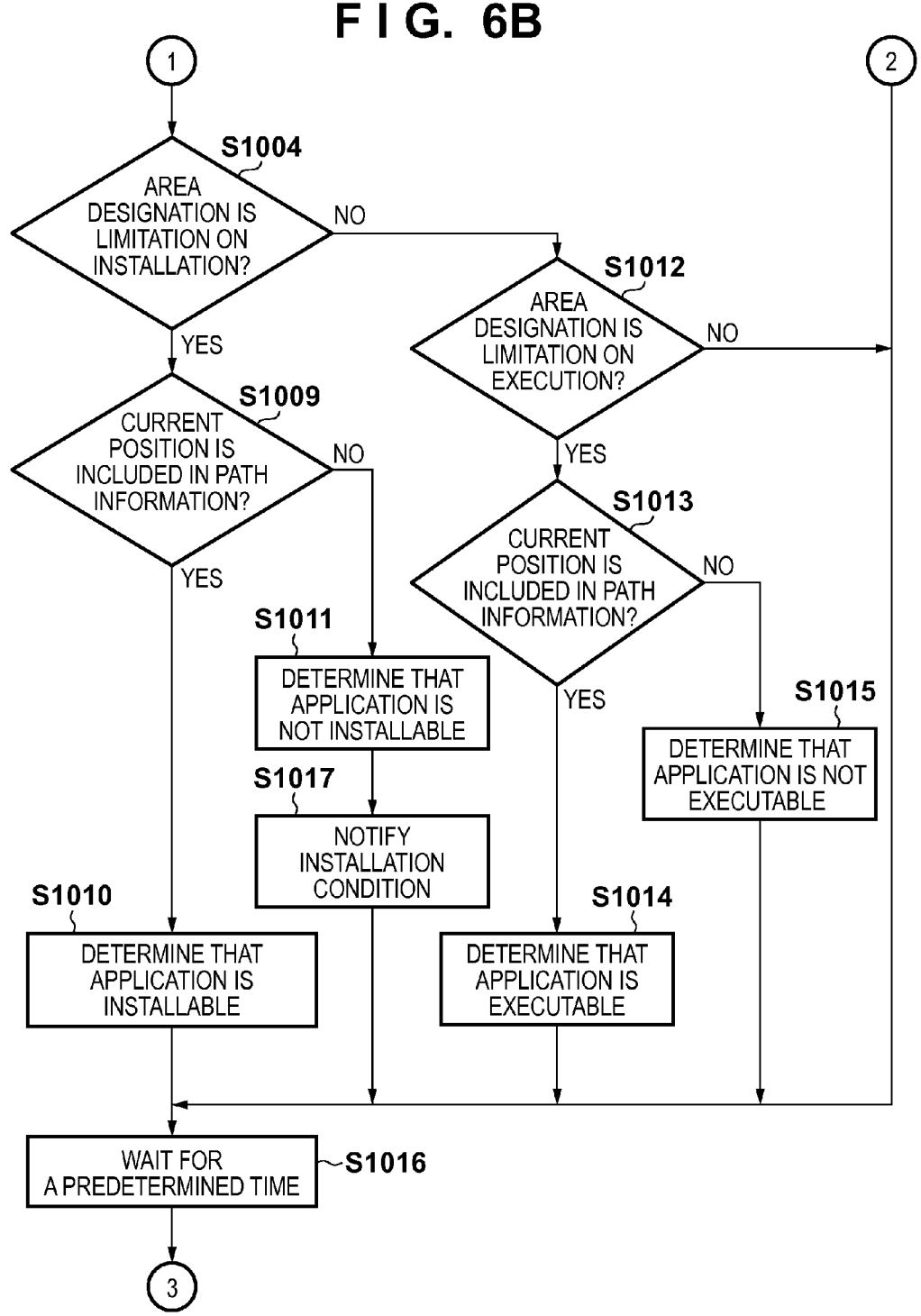

FIGS. 6A and 6B are a flowchart according to the second embodiment. This processing may be realized as a program controlled by the CPU 102 of the information processing apparatus 100, or may be realized by dedicated hardware. FIG. 7 is a block diagram showing a functional configuration according to the second embodiment.

In FIG. 6A, the application acquisition unit 301 acquires an application from an arbitrary application distribution service (step S1000). A GPS information acquisition unit 321 acquires GPS information 331 from a GPS mounted in the information processing apparatus 100 (step S1001).

Next, the application geographic information acquisition unit 303 acquires application geographic information 312 including area designation (step S1002).

The application geographic information acquisition unit 303 determines whether the area designation is path information (step S1003). When it is determined that the area designation included in the application is path information (YES in step S1003), path information 1001 is acquired and the processing goes to step S1004. Meanwhile, when it is determined that the area designation is not path information (NO in step S1003), the processing goes to step S1005.

In step S1004, the application geographic information acquisition unit 303 determines whether the area designation is limitation on installation of an application (step S1004). When it is determined that the area designation is limitation on installation (YES in step S1004), the processing goes to step S1009. Meanwhile, when it is determined that the area designation is not limitation on installation (NO in step S1004), the processing goes to step S1012.

When it is determined that the area designation is limitation on installation, the installation permission determination unit 304 determines whether the GPS information 331, which is the current position, is included in the path information 1001 (step S1009).

The determination in step S1009 utilizes the technique for determining whether a point is included in an arbitrary polygon, such as the non-zero winding number rule, the even-odd rule, or the like.

When it is determined that the GPS information 331 is included in the path information 1001 (YES in step S1009), the processing goes to step S1010. Meanwhile, when it is determined that the GPS information 331 is not included in the path information 1001 (NO in step S1009), the processing goes to step S1011.

When it is determined that the GPS information 331 is included in the path information 1001, the installation permission determination unit 304 determines that the application is installable (step S1010). Thereafter, the processing goes to step S1016.

Meanwhile, when it is determined that the GPS information 331 is not included in the path information 1001, the installation permission determination unit 304 determines that the application is not installable (step S1011).

Subsequent to step S1011, in step S1017, the installation permission determination unit 304 notifies the user of an installation condition for enabling application installation. Hereinafter, a calculation method of a distance to the installable point is described with reference to FIG. 8.

Figure 8:
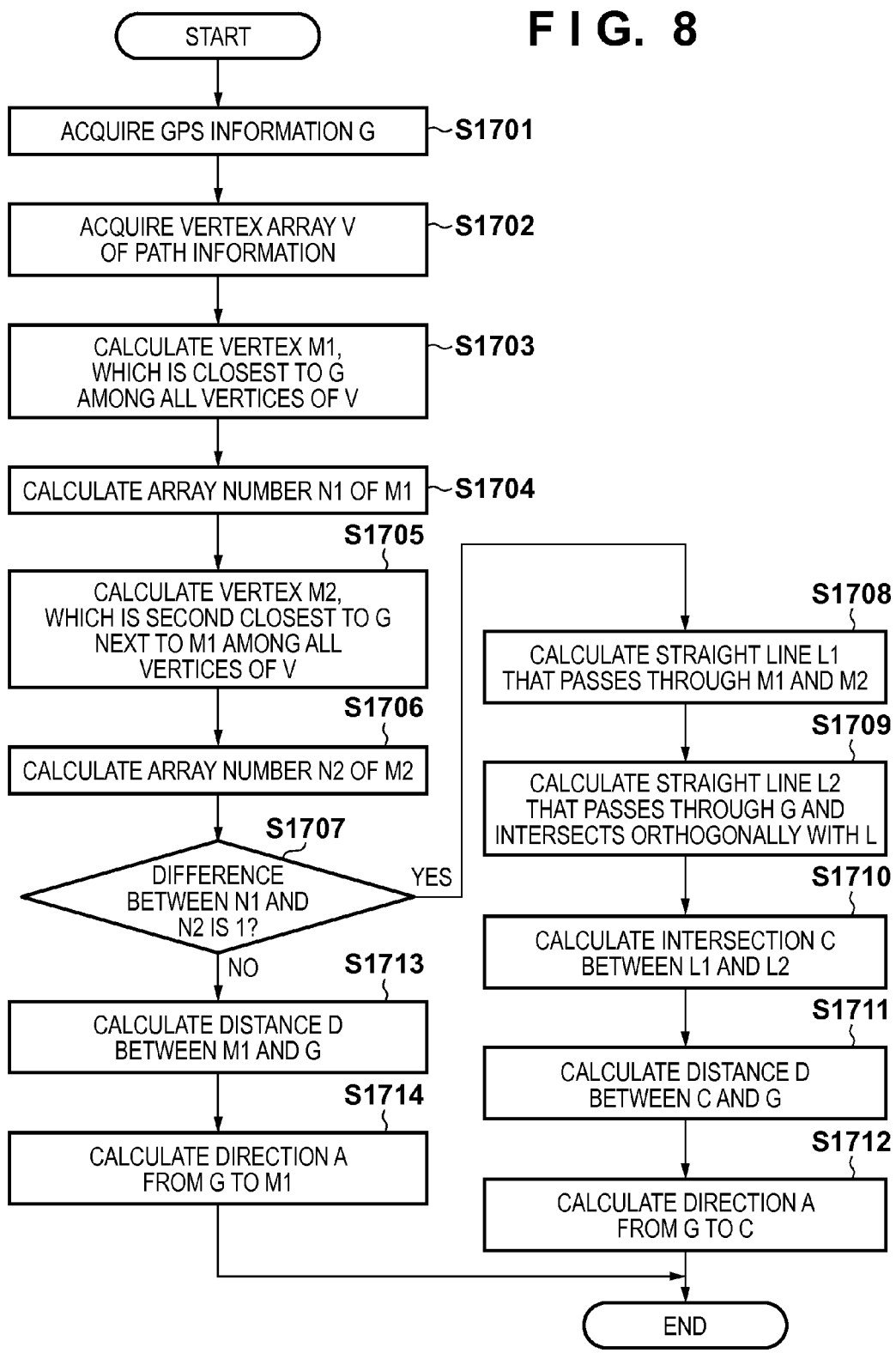
FIG. 8 is a flowchart describing a calculation method of a distance to an installable point.

Also, an example of notification in step S1017 in FIG. 8 is shown in FIGS. 9A and 9B. FIG. 9A shows a screen in steps S1000 to S1011. FIG. 9B shows a screen in step S1017.

In FIG. 8, the installation permission determination unit 304 acquires GPS information G (step S1701). Next, the installation permission determination unit 304 acquires a vertex array V of the path information 1001 (step S1702). Then, the installation permission determination unit 304 calculates a vertex M1, which is closest to the GPS information G among all vertices of the vertex array V (step S1703). The installation permission determination unit 304 calculates an array number N1 of the vertex M1 (step S1704).

Next, the installation permission determination unit 304 calculates a vertex M2, which is second closest to the GPS information G next to the vertex M1 among all vertices of the vertex array V (step S1705). Then, the installation permission determination unit 304 calculates an array number N2 of the vertex M2 (step S1706).

Next, the installation permission determination unit 304 determines whether the array numbers N1 and N2 are sequential numbers (step S1707). In other words, the installation permission determination unit 304 determines whether the difference between N1 and N2 is 1. When it is determined that N1 and N2 are sequential numbers, in other words, the difference is 1, the installation permission determination unit 304 calculates a straight line L1 that passes through M1 and M2 (step S1708). Herein, when N1 and N2 are sequential numbers, the point closest to G among the points included in the path information 1001 is an intersection between L1 and the perpendicular line from L1 to G.

Next, the installation permission determination unit 304 calculates a straight line L2 that passes through G and intersects orthogonally with L (step S1709). Then, the installation permission determination unit 304 calculates an intersection C between L1 and L2 (step S1710). Then, the installation permission determination unit 304 calculates a distance D between C and G (step S1711). Then, the installation permission determination unit 304 calculates a direction A from G to C (step S1712).

Accordingly, for instance, as shown in FIG. 9B, it is possible to propose the user the distance D as a moving distance, and the direction A as the moving direction. In FIG. 9B, the distance D is 200 m, and the arrow on the top left in FIG. 9B points to the direction A.

Meanwhile, when it is determined that N1 and N2 are not sequential numbers, the installation permission determination unit 304 calculates a distance D between M1 and G (step S1713). When N1 and N2 are not sequential numbers, the point closest to G among the points included in the path information 1001 is M1. Next, the installation permission determination unit 304 calculates a direction A from G to M1 (step S1714).

If the user moves in accordance with the notification, it is determined in step S1009 that the GPS information 331 is included in the path information 1001. Thereafter, in step S1010, it is determined that the application is installable. If the user instructs the information processing apparatus 100 to install the application, a notification of application installation as shown in FIG. 9C is sent.

When it is determined that the area designation is not path information in step S1003, the application geographic information acquisition unit 303 determines in step S1005 whether the area designation included in the application is a landmark. When it is determined that the area designation is a landmark (YES in step S1005), the processing goes to step S1006. Meanwhile, when it is determined that the area designation is not a landmark (NO in step S1005), the processing goes to step S1007.

In step S1006, an area designation conversion unit 1101 converts the landmark to path information 1001. Thereafter, the processing goes to step S1004.

Hereinafter, a specific method of converting area designation information to path information is described. FIG. 10 shows an example of an area designation conversion table 1102 of area designation and path information. In step S1006, the area designation conversion table 1102 is first acquired by the area designation conversion unit 1101.

Next, the area designation conversion unit 1101 acquires path information, which is corresponding to the designated landmark, from the area designation conversion table 1102. For instance, assuming that area designation of the application is (Japan, Tokyo, Ota-district, Yanonland), path information (path area) that is corresponding to (Japan, Tokyo, Ota-district, Yanonland) can be found in FIG. 10.

FIG. 10 shows an example in which the area designation conversion table 1102 has a mixture of landmarks and area names. However, separate conversion tables may be prepared for landmarks and area names.

When it is determined in step S1005 that the area designation is not a landmark, in step S1007, the application geographic information acquisition unit 303 determines whether the area designation included in the application is an area name. When it is determined that the area designation is an area name (YES in step S1007), the processing goes to step S1008. Meanwhile, when it is determined that the area designation is not an area name (NO in step S1007), the processing goes to step S1016.

In step S1008, the area designation conversion unit 1101 converts the area name to path information 1001. Next, the processing goes to step S1004. In step S1008, the area designation conversion unit 1101 uses the area designation conversion table 1102 to convert the area name to path information as similar to step S1006.

In step S1004, when it is determined that the area designation is not limitation on installation of an application, then in step S1012, the application geographic information acquisition unit 303 determines whether the area designation is limitation on execution of an application. When it is determined that the area designation is limitation on application execution (YES in step S1012), the processing goes to step S1013. Meanwhile, when it is determined that the area designation is not limitation on application execution (NO in step S1012), the processing goes to step S1016.

When it is determined that the area designation is limitation on application execution, an execution permission determination unit 1103 determines whether the GPS information 331, which is the current position, is included in the path information 1001 (step S1013). When it is determined that the GPS information 331 is included in the path information 1001 (YES in step S1013), the processing goes to step S1014. Meanwhile, when it is determined that the GPS information 331 is not included in the path information 1001 (NO in step S1013), the processing goes to step S1015.

When it is determined that the GPS information 331 is included in the path information 1001, the execution permission determination unit 1103 determines that the application is executable (step S1014). Thereafter, the processing goes to step S1016.

Meanwhile, when it is determined that the GPS information 331 is not included in the path information 1001, the execution permission determination unit 1103 determines that the application is not executable (step S1015). Thereafter, the processing goes to step S1016.

In step S1016, the processing waits for a predetermined time, and the processing goes to step S1001. As described above, according to the second embodiment, it is possible to determine whether an application can be installed or executed in accordance with user's movement, and installation or execution of the application can adaptively be controlled.

Third Embodiment

The second embodiment has described a configuration for determining whether or not installation or execution of an application is possible in accordance with user's movement, in a case where an installable area and an executable area are both described in application geographic information. The third embodiment describes a method of uninstalling an application when a user moves out of an application installable area. Furthermore, the third embodiment describes a method of forbidding application execution when a user moves out of an application executable area.

Figure 11A:
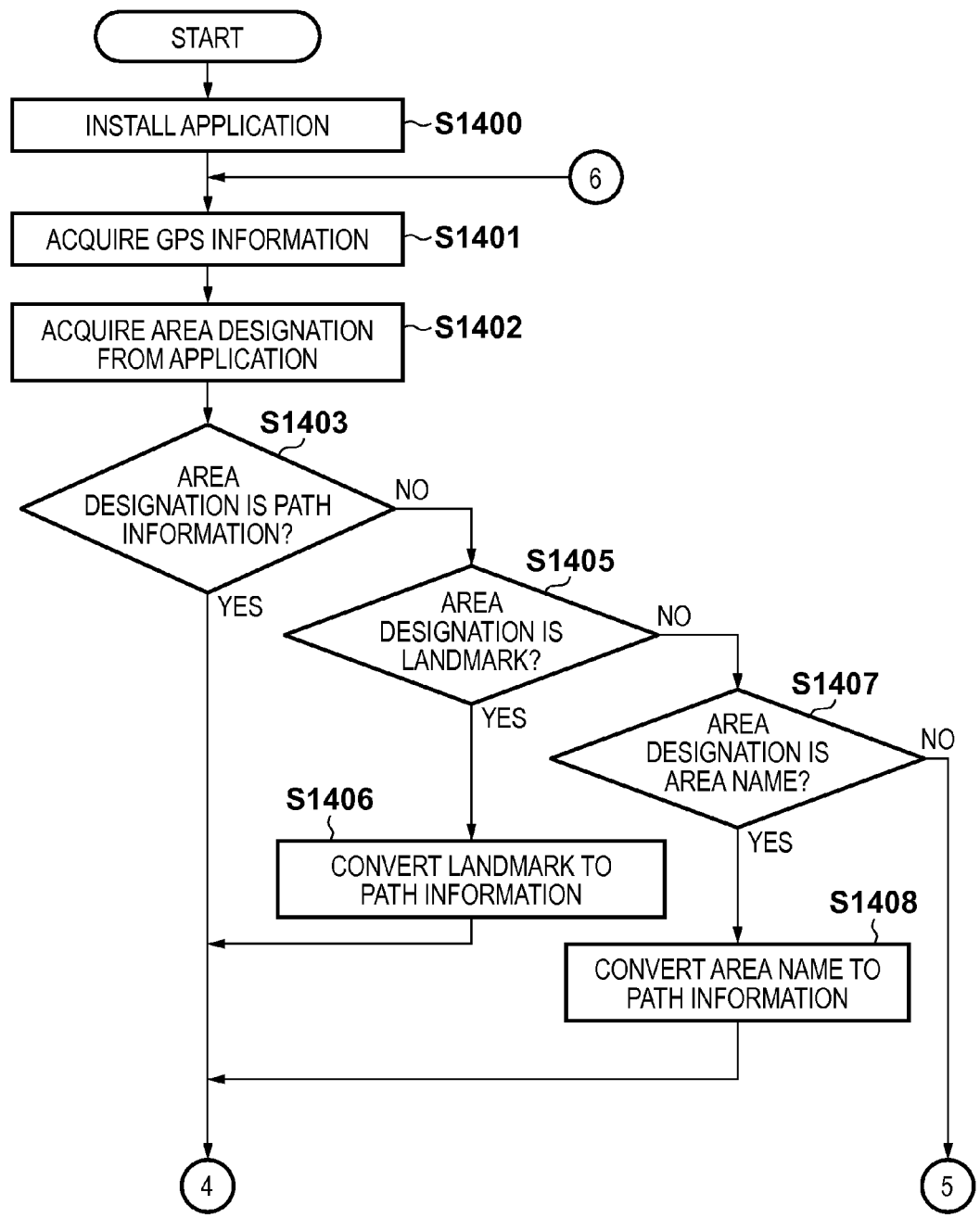
FIGS. 11A and 11B are a flowchart describing processing according to the third embodiment.
Figure 11B:
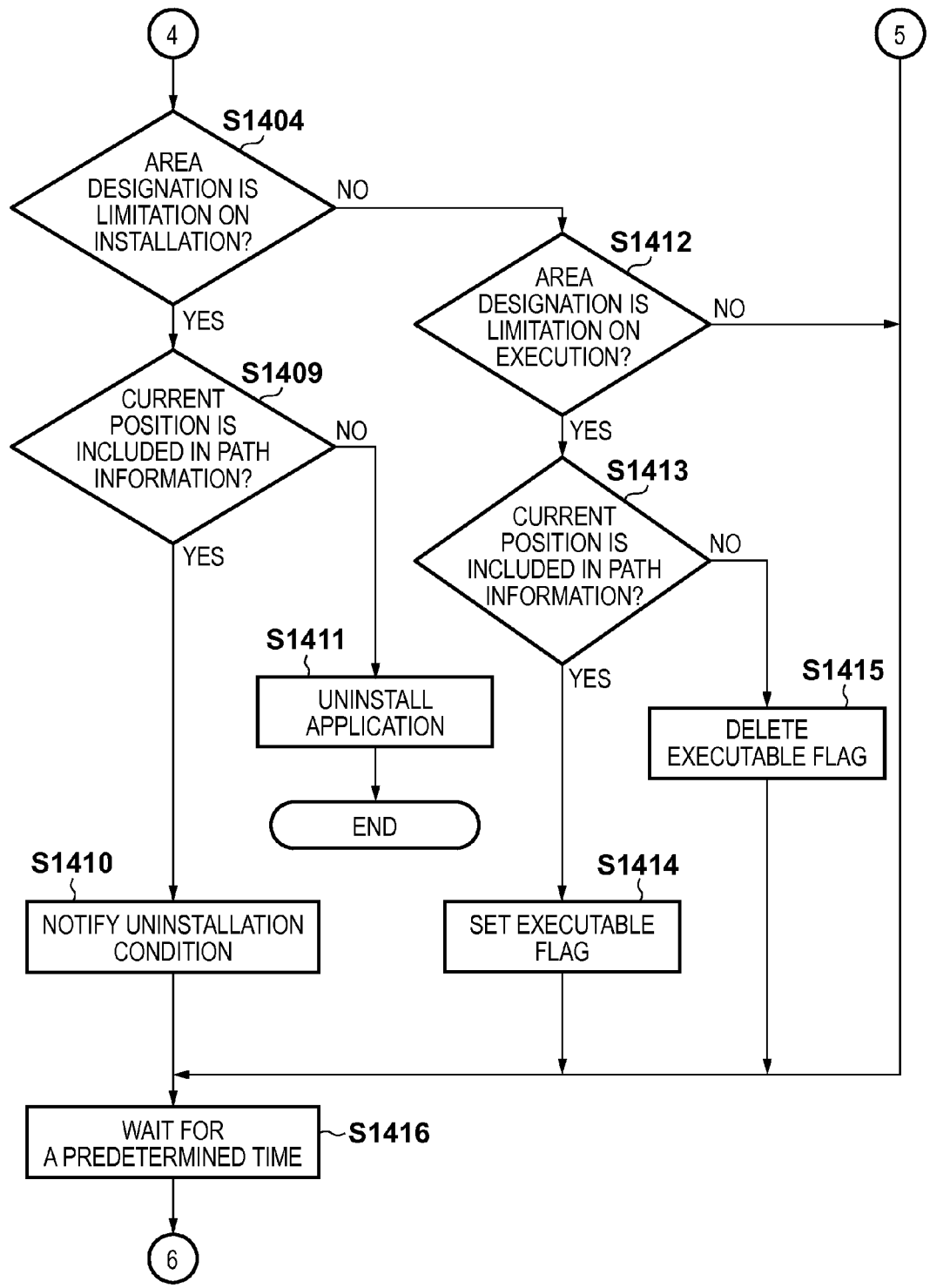

FIGS. 11A and 11B are a flowchart according to the third embodiment. This processing may be realized as a program controlled by the CPU 102 of the information processing apparatus 100, or may be realized by dedicated hardware. FIG. 7 is a block diagram showing a functional configuration according to the third embodiment.

In FIG. 11A, the application acquisition unit 301 installs an application which is determined as being installable (step S1400). Next, the GPS information acquisition unit 321 acquires GPS information 331 from the GPS mounted in the information processing apparatus 100 (step S1401).

Next, the application geographic information acquisition unit 303 acquires application geographic information 312 (step S1402). The application geographic information acquisition unit 303 determines whether area designation is path information (step S1403). When it is determined that the area designation included in the application is path information (YES in step S1403), the path information 1001 is acquired, and the processing goes to step S1404. Meanwhile, when it is determined that the area designation is not path information (NO in step S1403), the processing goes to step S1405.

In step S1404, the application geographic information acquisition unit 303 determines whether the area designation is limitation on installation of an application (step S1404). When it is determined that the area designation is limitation on application installation (YES in step S1404), the processing goes to step S1409. Meanwhile, when it is determined that the area designation is not limitation on application installation (NO in step S1404), the processing goes to step S1412.

When it is determined that the area designation is limitation on installation, an uninstallation permission determination unit 1104 determines whether GPS information 331, which is the current position, is included in the path information 1001 (step S1409).

Similar to the second embodiment, the determination in step S1409 utilizes the technique for determining whether a point is included in an arbitrary polygon, such as the non-zero winding number rule, the even-odd rule, or the like.

When it is determined that the GPS information 331 is included in the path information 1001 (YES in step S1409), the processing goes to step S1410. Meanwhile, when it is determined that the GPS information 331 is not included in the path information 1001 (NO in step S1409), the processing goes to step S1411.

When it is determined that the GPS information 331 is included in the path information 1001, the uninstallation permission determination unit 1104 determines that the application is installable. Thereafter, the uninstallation permission determination unit 1104 calculates a distance from the current position to the boundary line of an uninstallable area, and notifies the distance as an uninstallation condition (step S1410). Thereafter, the processing goes to step S1416.

In step S1410, the uninstallation permission determination unit 1104 notifies the user of the distance to the point (boundary line) where the application is uninstalled. Herein, the calculation method of a distance to the point where the application is uninstalled is described with reference to FIG. 12.

Figure 12:
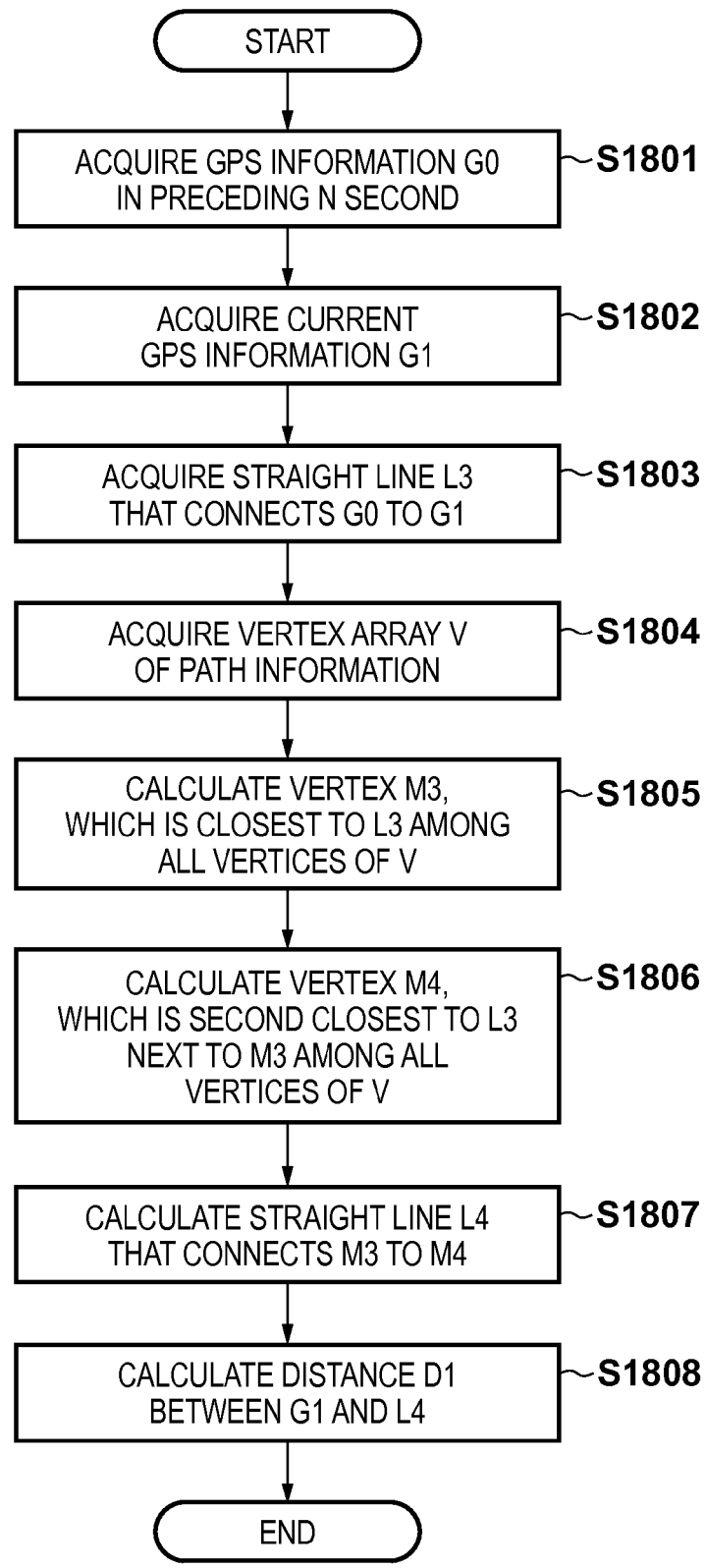
FIG. 12 is a flowchart describing a calculation method of a distance to a point where an application is uninstalled according to the third embodiment.

In FIG. 12, the uninstallation permission determination unit 1104 acquires a user's moving direction. For this, GPS information G0 in the preceding N second is acquired (step S1801). N may be an arbitrary value, such as 0.1 second, 1 second, or 10 seconds. Next, the uninstallation permission determination unit 1104 acquires current GPS information G1 (step S1802). Next, the uninstallation permission determination unit 1104 acquires a straight line L3 that connects G0 to G1 (step S1803). Next, the uninstallation permission determination unit 1104 acquires a vertex array V of the path information (step S1804).

Next, the uninstallation permission determination unit 1104 calculates a vertex M3, which is closest to L3 among all vertices of the vertex array V (step S1805). Then, the uninstallation permission determination unit 1104 calculates a vertex M4, which is second closest to L3 next to the vertex M3 among all vertices of the vertex array V (step S1806). The uninstallation permission determination unit 1104 calculates a straight line L4 that connects M3 to M4 (step S1807). Then, the uninstallation permission determination unit 1104 calculates a distance D1 between G1 and L4 (step S1808).

Next, an example of notification is shown in FIGS. 13A and 13B. FIG. 13A shows a screen in steps S1400 to S1409. FIG. 13B shows a screen in step S1410. The distance D1 is proposed to the user as a moving distance for uninstalling an application. In FIG. 13B, the distance D1 is 100 m.

When the user moves in the direction outside the installable area, it is determined in step S1409 that the GPS information 331 is not included in the path information 1001. Thereafter, in step S1411, it is determined that the application can be uninstalled. The uninstallation permission determination unit 1104 uninstalls the application. In this stage, the uninstallation of the application is notified to the user as shown in FIG. 13C.

As described above, when it is determined that the GPS information 331 is not included in the path information 1001, the uninstallation permission determination unit 1104 determines that the application is not installable. Thereafter, the uninstallation permission determination unit 1104 uninstalls the application (step S1411).

In step S1403, when it is determined that the area designation is not path information, the application geographic information acquisition unit 303 determines in step S1405 whether the area designation included in the application is a landmark. When it is determined that the area designation is a landmark (YES in step S1405), the processing goes to step S1406.

Meanwhile, when it is determined that the area designation is not a landmark (NO in step S1405), the processing goes to step S1407.

In step S1406, the area designation conversion unit 1101 converts the landmark to path information 1001. Thereafter, the processing goes to step S1404.

The specific method of converting area designation information to path information is similar to that of the second embodiment.

In step S1405, when it is determined that the area designation is not a landmark, then in step S1407, the application geographic information acquisition unit 303 determines whether the area designation included in the application is an area name. When it is determined that the area designation is an area name (YES in step S1407), the processing goes to step S1408. Meanwhile, when it is determined that the area designation is not an area name (NO in step S1407), the processing goes to step S1416.

In step S1408, the area designation conversion unit 1101 converts the area name to path information 1001. Next, the processing goes to step S1404. In step S1408, the area designation conversion unit 1101 uses the area designation conversion table 1102 to convert the area name to path information as similar to step S1406.

In step S1404, when it is determined that the area designation is not limitation on installation of an application, then in step S1412, the application geographic information acquisition unit 303 determines whether the area designation is limitation on execution of an application. When it is determined that the area designation is limitation on application execution (YES in step S1412), the processing goes to step S1413. Meanwhile, when it is determined that the area designation is not limitation on application execution (NO in step S1412), the processing goes to step S1416.

When it is determined that the area designation is limitation on application execution, the execution permission determination unit 1103 determines whether the GPS information 331, which is the current position, is included in the path information 1001 (step S1413). When it is determined that the GPS information 331 is included in the path information 1001 (YES in step S1413), the processing goes to step S1414. Meanwhile, when it is determined that the GPS information 331 is not included in the path information 1001 (NO in step S1413), the processing goes to step S1415.

When it is determined that the GPS information 331 is included in the path information 1001, the execution permission determination unit 1103 determines that the application is executable. Thereafter, the execution permission determination unit 1103 sets an application executable flag (step S1414). Then, the processing goes to step S1416.

Meanwhile, when it is determined that the GPS information 331 is not included in the path information 1001, the execution permission determination unit 1103 determines that the application is not executable. Thereafter, the execution permission determination unit 1103 deletes the application executable flag (step S1415). Then, the processing goes to step S1416.

The application executable flag is a value that is referred to by the information processing apparatus 100 when an application is executed. For instance, if the value is 1, the execution permission determination unit 1103 determines that the application is executable, whereas if the value is 0, it determines that the application is not executable. In other words, the application execution is forbidden.

In step S1416, the processing waits for a predetermined time, and the processing goes to step S1401. As described above, according to the third embodiment, it is possible to uninstall an application or forbid application execution in accordance with user's movement.

Fourth Embodiment

The fourth embodiment describes a method of deciding priority order of installation in accordance with area designation included in an application.

FIG. 14 is a flowchart according to the fourth embodiment. This processing may be realized as a program controlled by the CPU 102 of the information processing apparatus 100, or may be realized by dedicated hardware. The configuration of the functions according to the fourth embodiment utilizes part of the configuration shown in FIG. 7.

In the fourth embodiment, the GPS information acquisition unit 321 acquires GPS information 331 for acquiring the user's current position (step S1601). Next, the application acquisition unit 301 compares geographic information, corresponding to the GPS information 331, with application geographic information acquired by the application geographic information acquisition unit 303, and based on the comparison result, acquires an installable application number N in the current position (step S1602). Next, in the application acquisition unit 301, an array L having a length N is generated (step S1603).

Next, in the application acquisition unit 301, an application name is stored in L (step S1604). In the application acquisition unit 301, L is rearranged in order closest to the current position (order of high priority) (step S1605). In other words, the application acquisition unit 301 decides the application's priority order. Next, the application acquisition unit 301 waits for a predetermined time (step S1606). Thereafter, the processing goes to step S1601. By the above-described processing, the applications stored in the array L change in accordance with user's movement. Meanwhile, the information processing apparatus 100 may end the processing after step S1606 is completed.

For instance, when an application is to be installed in the first and second embodiments, the information processing apparatus 100 can sequentially install applications stored in L from the beginning, until the storage capacity of the apparatus becomes full. Furthermore, when an application is to be installed, the information processing apparatus 100 can install an arbitrary number of applications stored in L from the beginning.

Similarly, the application execution, application uninstallation, or forbiddance of application execution according to the third embodiment may be controlled in accordance with the priority order of applications decided in the fourth embodiment.

As described above, according to the fourth embodiment, in addition to the effects described in the first to third embodiments, because priority order is given to applications, it is possible to execute processing on an appropriate application according to the user's current position as a application to processed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-101676 filed on Apr. 26, 2012, and No. 2013-051134 filed on Mar. 14, 2013, which are hereby incorporated by reference herein in their entirety.

What is claimed is:

1. An information processing apparatus for controlling installation of an application, the information processing apparatus comprising:
a CPU coupled to a memory device and programmed to provide:
an acquisition unit configured to acquire an application to be installed from an application distribution service or an external memory device;
a security policy geographic information acquisition unit configured to acquire security policy geographic information, which is geographic information of a target distribution area of the application where a user of the information processing apparatus permits installation, from security policy that defines processing regarding the application in the information processing apparatus;
an application geographic information acquisition unit configured to acquire application geographic information, which is geographic information of a target distribution area of the application that includes geographic information of a predetermined area where application execution is recommended, among information previously associated with the application acquired by the acquisition unit; and
a determination unit configured to compare the security policy geographic information with the application geographic information, and determine whether to permit installation of the application acquired by the acquisition unit based on the comparison result.

2. The information processing apparatus according to claim 1,
wherein each of the security policy geographic information and the application geographic information is information hierarchically represented by identification information of each of a plurality of different sized areas, and
wherein the determination unit determines whether to permit installation of the application acquired by the acquisition unit based on a containment relationship of a hierarchy level indicated by each of the security policy geographic information and the application geographic information.

3. The information processing apparatus according to claim 1,
wherein each of the security policy geographic information and the application geographic information is information hierarchically represented by identification information of each of a plurality of different sized areas, and
wherein the determination unit determines that the application acquired by the acquisition unit is installable if all elements in each hierarchy level indicated by each of the security policy geographic information and the application geographic information match.

4. The information processing apparatus according to claim 1, wherein the application geographic information includes at least one of: geographic information of an area where application installation is permitted, geographic information of an area where application installation is forbidden, geographic information of an area where application execution is permitted, and geographic information of an area where application execution is forbidden.

5. A control method of an information processing apparatus for controlling installation of an application, the control method comprising steps of:
acquiring an application to be installed from an application distribution service or an external memory device;
acquiring security policy geographic information, which is geographic information of a target distribution area of the application where a user of the information processing apparatus permits installation, from security policy that defines processing regarding the application in the information processing apparatus;
acquiring application geographic information, which is geographic information of a target distribution area of the application that includes geographic information of a predetermined area where application execution is recommended, among information previously associated with the acquired application; and
comparing, using a CPU microprocessor, the security policy geographic information with the application geographic information, and determining, using the CPU microprocessor, whether to permit installation of the acquired application based on the comparison result.

6. The control method according to claim 5,
wherein each of the security policy geographic information and the application geographic information is information hierarchically represented by identification information of each of a plurality of different sized areas, and
wherein the determination unit determines whether to permit installation of the application acquired by the acquisition unit based on a containment relationship of a hierarchy level indicated by each of the security policy geographic information and the application geographic information.

7. The control method according to claim 5,
wherein each of the security policy geographic information and the application geographic information is information hierarchically represented by identification information of each of a plurality of different sized areas, and
wherein the determination unit determines that the application acquired by the acquisition unit is installable if all elements in each hierarchy level indicated by each of the security policy geographic information and the application geographic information match.

8. The control method according to claim 5, wherein the application geographic information includes at least one of: geographic information of an area where application installation is permitted, geographic information of an area where application installation is forbidden, geographic information of an area where application execution is permitted, and geographic information of an area where application execution is forbidden.

9. A non-transitory computer-readable storage medium storing a program that when executed causes a computer to perform a control method of an information processing apparatus for controlling installation of an application, the computer comprising functions of:
an acquisition unit configured to acquire an application to be installed from an application distribution service or an external memory device;
a security policy geographic information acquisition unit configured to acquire security policy geographic information, which is geographic information of a target distribution area of the application where a user of the information processing apparatus permits installation, from security policy that defines processing regarding the application in the information processing apparatus;
an application geographic information acquisition unit configured to acquire application geographic information, which is geographic information of a target distribution area of the application that includes geographic information of a predetermined area where application execution is recommended, among information previously associated with the application acquired by the acquisition unit; and
a determination unit configured to compare the security policy geographic information with the application geographic information, and determine whether to permit installation of the application acquired by the acquisition unit based on the comparison result.

10. The non-transitory computer-readable storage medium according to claim 9,
wherein each of the security policy geographic information and the application geographic information is information hierarchically represented by identification information of each of a plurality of different sized areas, and
wherein the determination unit determines whether to permit installation of the application acquired by the acquisition unit based on a containment relationship of a hierarchy level indicated by each of the security policy geographic information and the application geographic information.

11. The non-transitory computer-readable storage medium according to claim 9,
wherein each of the security policy geographic information and the application geographic information is information hierarchically represented by identification information of each of a plurality of different sized areas, and
wherein the determination unit determines that the application acquired by the acquisition unit is installable if all elements in each hierarchy level indicated by each of the security policy geographic information and the application geographic information match.

12. The non-transitory computer-readable storage medium according to claim 9, wherein the application geographic information includes at least one of: geographic information of an area where application installation is permitted, geographic information of an area where application installation is forbidden, geographic information of an area where application execution is permitted, and geographic information of an area where application execution is forbidden.

* * * * *